United States Patent
Takahashi

[11] Patent Number: 6,046,847
[45] Date of Patent: Apr. 4, 2000

[54] REAR PROJECTION SCREEN CONTAINING FRESNEL LENS SHEET UTILIZING ALTERNATIVE FOCAL LENGTHS

[75] Inventor: Katsunori Takahashi, Tokyo-To, Japan

[73] Assignee: Dai Nippon Printing Co., Ltd., Japan

[21] Appl. No.: 09/056,768

[22] Filed: Apr. 8, 1998

[30] Foreign Application Priority Data

Apr. 11, 1997 [JP] Japan .................................. 9-094028

[51] Int. Cl.[7] .............................. G03B 21/60; G02B 3/08
[52] U.S. Cl. ........................................ 359/457; 359/742
[58] Field of Search .................................. 359/456, 457, 359/460, 742, 743

[56] References Cited

U.S. PATENT DOCUMENTS

| | | | |
|---|---|---|---|
| 3,004,470 | 7/1961 | Rühle | 359/742 |
| 4,162,122 | 7/1979 | Cohen | 351/161 |
| 4,340,283 | 7/1982 | Cohen | 351/161 |
| 4,367,016 | 1/1983 | Willhelm | 350/452 |
| 4,443,088 | 4/1984 | Ohtaka | 354/200 |
| 4,824,227 | 4/1989 | Goldenberg et al. | 350/452 |
| 5,076,684 | 12/1991 | Simpson et al. | 351/168 |
| 5,151,826 | 9/1992 | Pasco | 359/742 |
| 5,206,761 | 4/1993 | Ogino | 359/457 |
| 5,208,620 | 5/1993 | Mitsutake et al. | 353/74 |
| 5,412,631 | 5/1995 | VanBreeman | 350/128 |
| 5,467,221 | 11/1995 | Iwahara et al. | 359/449 |
| 5,623,365 | 4/1997 | Kuba | 359/569 |
| 5,751,387 | 5/1998 | Iigahama et al. | 349/95 |

FOREIGN PATENT DOCUMENTS

| | | |
|---|---|---|
| 0874268 | 10/1998 | European Pat. Off. . |
| 56-147140 | 11/1981 | Japan . |
| 7-219053 | 8/1995 | Japan . |

OTHER PUBLICATIONS

Patent Abstracts of Japan; vol. 095, No. 011; Dec. 26, 1995 & JP 07 219053 A (Dai Nippon Printing Co Ltd); Aug. 18, 1995; *abstract*.

Patent Abstracts of Japan; vol. 006, No. 027 (P–102); Feb. 17, 1982 & JP 56 147140 A (Matsushita Electric Ind Co Ltd); Nov. 14, 1981; *abstract*.

*Primary Examiner*—Safet Metjahic
*Assistant Examiner*—Christopher E. Mahoney
*Attorney, Agent, or Firm*—Parkhurst & Wendel, LLP

[57] ABSTRACT

A Fresnel lens sheet (11) used in combination with a lenticular lens sheet (12) to form a rear projection screen of a TV set, has Fresnel lens elements (15) on a front surface thereof. The Fresnel lens elements (15) include a first group of Fresnel lens elements (15a) and a second group of Fresnel lens elements (15b). The first group of lens elements (15a) has a first focal length ($f_1$) which is greater than a second focal length ($f_2$) of the second group of lens elements (15b). The first group lens elements (15a) and the second group of lens elements (15b) are disposed alternately. The above configuration provides an increased vertical angular range of a viewing region from which pictures displayed on the rear projection screen can be viewed satisfactorily, as well as an increased luminance of the rear projection screen.

8 Claims, 7 Drawing Sheets

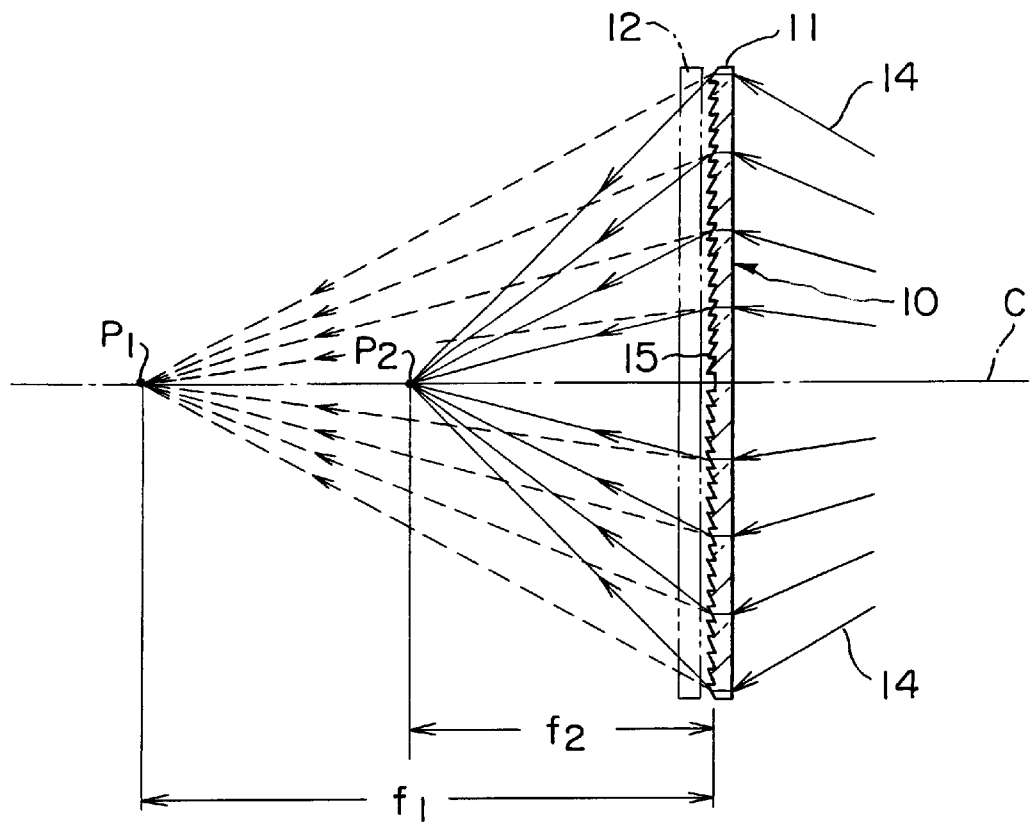
F I G. 3A
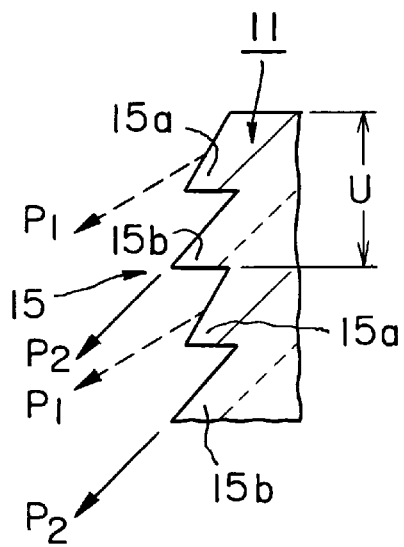
F I G. 3B
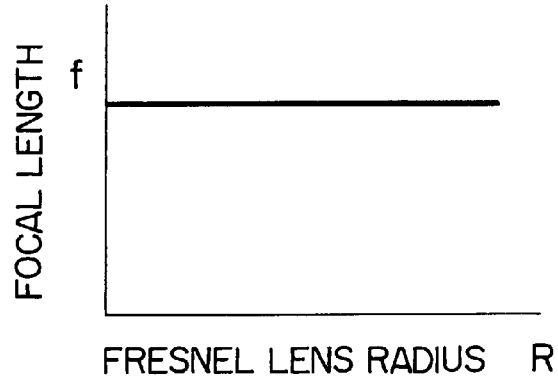
F I G. 4

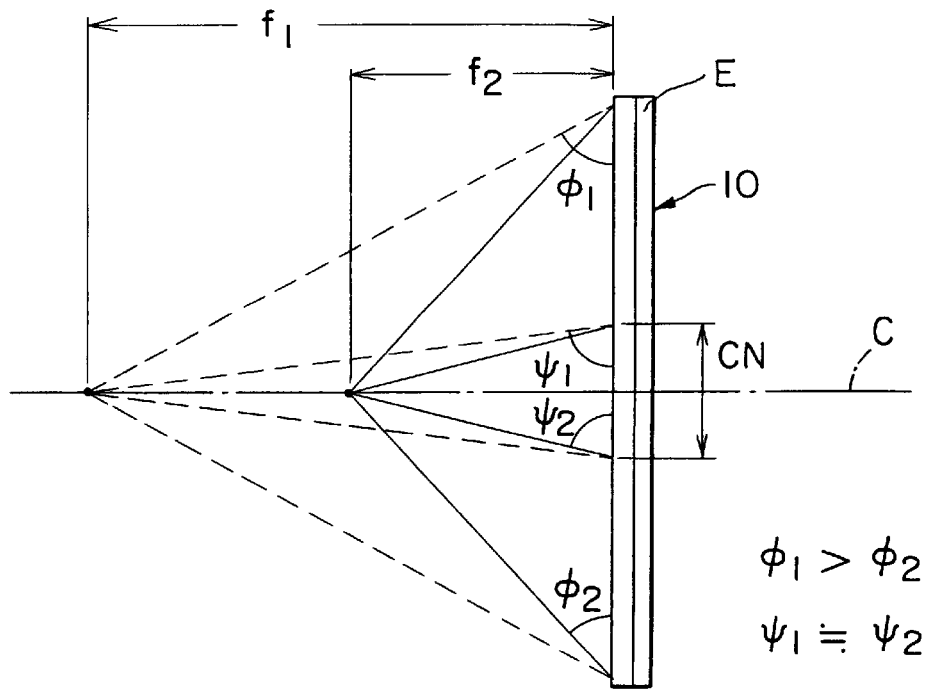
F I G. 5
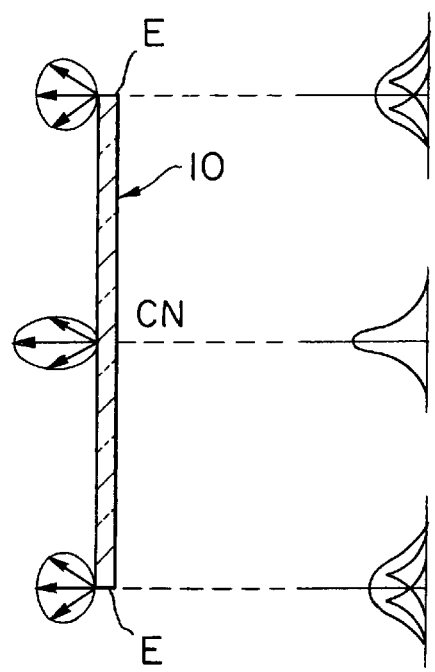
F I G. 6

REAR PROJECTION SCREEN CONTAINING FRESNEL LENS SHEET UTILIZING ALTERNATIVE FOCAL LENGTHS

BACKGROUND OF THE INVENTION

1. Field of the Invention

The present invention relates to a Fresnel lens sheet to be combined with a lenticular lens sheet to form a rear projection screen for a rear projection TV set, and a rear projection screen employing the Fresnel lens.

2. Description of the Related Art

A conventional rear projection screen is designed so that TV images displayed on the rear projection screen can be satisfactorily viewed by a viewer in a specific viewing region owing to the light directing characteristic of the focusing effect of a Fresnel lens sheet, the horizontal distribution of light by the sampling effect of the lenticular lens sheet, and the vertical distribution of light by the light diffusing effect of a diffusing substance contained in the rear projection screen.

Although the specific viewing region suitable for viewing pictures displayed on this conventional rear projection screen has a wide horizontal angular range, the same has a narrow vertical angular range. The vertical angular range of the viewing region can be increased by increasing the diffusing substance content of the rear projection screen to enhance the diffusing effect of the rear projection screen. However, the quantity of light traveling perpendicularly to the rear projection screen decreases and the peak screen gain of the rear projection screen is lowered if the diffusion of light is enhanced by increasing the diffusing substance content, with resultant decrease in the luminance of the rear projection screen as viewed from a viewing position on an axis perpendicular to the center of the rear projection screen.

SUMMARY OF THE INVENTION

Accordingly, it is an object of the present invention to provide a Fresnel lens sheet capable of enlarging the vertical angular range of a viewing region from which pictures displayed on a rear projection screen can be satisfactorily viewed and of increasing the absolute luminance of a rear projection screen.

Another object of the present invention is to provide a rear projection screen providing a viewing region from which pictures displayed thereon can be satisfactorily viewed having a wide vertical angular range and capable of displaying pictures in an increased absolute luminance.

According to a first aspect of the present invention, there is provided a Fresnel lens sheet for use in combination with a lenticular lens sheet in a rear projection screen, comprising parallel Fresnel lens elements provided on a front surface of the Fresnel lens sheet for controlling light rays incident on a rear surface thereof to pass therethrough to a front side thereof; wherein the Fresnel lens elements include: a first group of Fresnel lens elements having a first focal length; and a second group of Fresnel lens elements having a second focal length, the first focal length being greater than the second focal length.

According to a second aspect of the present invention, there is provided a Fresnel lens sheet for use in combination with a lenticular lens sheet in a rear projection screen, comprising parallel Fresnel lens elements provided on a front surface of the Fresnel lens sheet for controlling light rays incident on a rear surface thereof to pass therethrough to a front side thereof; wherein the Fresnel lens elements include: a first group of Fresnel lens elements having focal lengths within a first range; and a second group of Fresnel lens elements having focal lengths within a second range, the focal lengths of the first range having larger values than the focal lengths of the second range.

According to a third aspect of the present invention, there is provided a rear projection screen comprising a Fresnel lens sheet and a lenticular lens sheet which are arranged in a face-to-face disposition, the Fresnel lens sheet having parallel Fresnel lens elements disposed at a pitch on a front surface of the Fresnel lens sheet for controlling light rays incident on a rear surface thereof to pass therethrough to the lenticular lens sheet, the lenticular lens sheet including parallel lenticular lenses each having a width and facing the Fresnel lens elements; wherein the Fresnel lens elements include: a first group of Fresnel lens elements having a first focal length or a first range of focal lengths; a second group of Fresnel lens elements having a second focal length or a second range of focal lengths; and a Nth group of Fresnel lens elements having a Nth focal length or a Nth range of focal lengths; wherein conditions of the following formula exist $$2 \leq N \leq PL/PF$$

where: PL is the width of the lenticular lenses, PF is the pitch of the Fresnel lens elements, and N is the number of the groups of the Fresnel lens elements.

BRIEF DESCRIPTION OF THE DRAWINGS

FIG. 3A is a schematic view showing the principle of an embodiment of the Fresnel lens sheet according to the present invention;

FIG. 3B is an enlarged fragmental section showing an upper part of the Fresnel lens sheet shown in FIG. 3A;

FIG. 4 is a graph showing the relationship between Fresnel lens radius and focal length;

FIG. 5 is a diagrammatic view explaining an advantageous effect of the Fresnel lens sheet according to the present invention;

FIG. 6 is a diagrammatic view explaining vertical light diffusing characteristic of the rear projection screen of the present invention;

DESCRIPTION OF THE PREFERRED EMBODIMENTS

Preferred embodiments of the present invention will be described hereafter with reference to the accompanying drawings.

Figure 1:
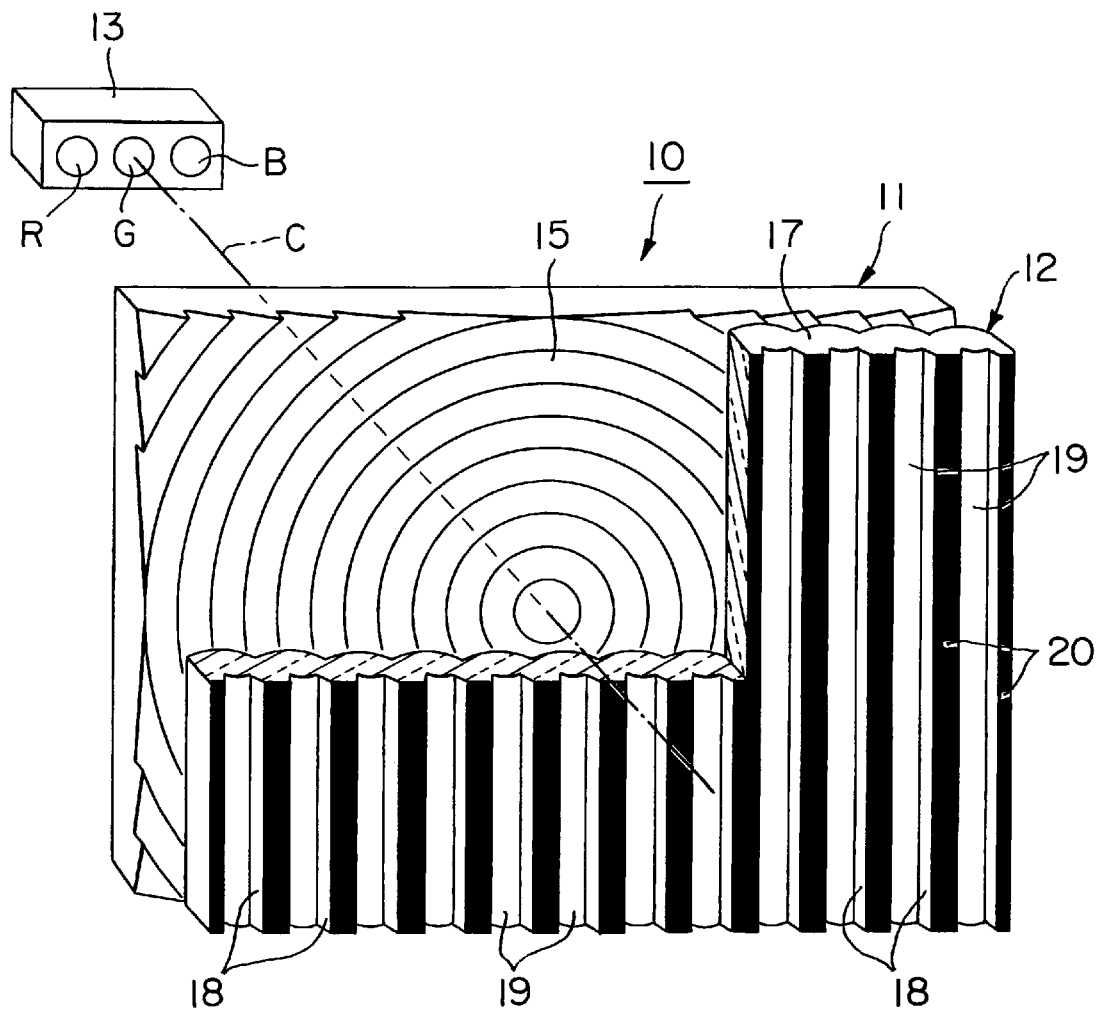
FIG. 1 is a perspective view showing a rear projection screen.

FIG. 1 illustrates in perspective view a light transmission screen or rear projection screen 10 which comprises a Fresnel lens sheet 11 and a lenticular lens sheet 12, as is known in the art. An image light is projected to the rear surface of the Fresnel lens sheet 11 by means of a projector 13 having R (red), G (green) and B (blue) projector sections R, G and B, for example. The optical axis of the rear projection system is indicated by reference numeral C. The Fresnel lens sheet 11 is formed with a number of minute concentric Fresnel lens elements 15 on the front surface thereof.

Figure 2:
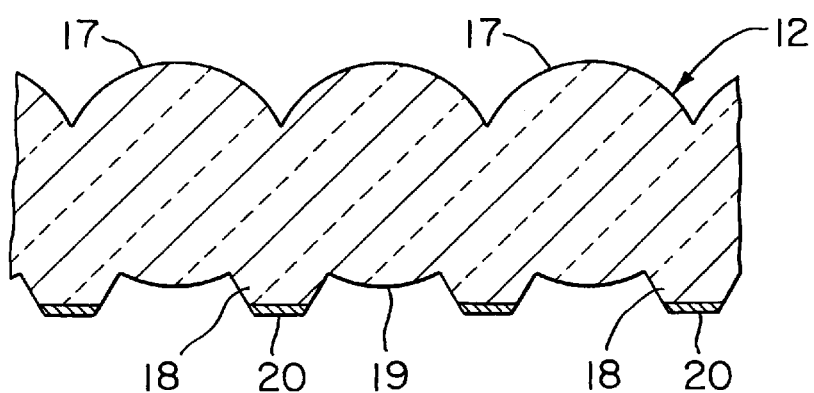
FIG. 2 is a fragmental view, in horizontal section, of a lenticular lens sheet included in the rear projection screen of FIG. 1.

As is known in the art, the lenticular lens sheet 12 has parallel rows of vertically extending lenticular lenses 17 on the rear side, as best shown in FIG. 2. On the front side of the lenticular, lens sheet 12 are provided parallel vertical ridges 18 and convex lens portions 19 formed between adjoining ridges 18. The tops of the ridges 18 are covered with light-impermeable black stripes 20, respectively. The rear projection screen 10 is typically used in a rear projection type TV set.

FIG. 3A shows a schematic section of the rear projection screen 10 along the optical axis C. An image light 14 from the projector 13 (not shown in FIG. 3A) is projected to the rear surface of the Fresnel lens sheet 11 in the form of diverging light rays as shown and passed forward through the lenticular lens sheet 12 shown by imaginary lines to the front or observation side, as is well known in the art.

FIG. 3B shows on an enlarged scale an upper end portion of the Fresnel lens sheet 11 shown in FIG. 3A. The Fresnel lens sheet 11 has a number of parallel or concentric Fresnel lens elements 15 in the form of ridges of triangular cross section as shown, and these Fresnel lens elements 15 are made up of a repetition of a pair of first lens element 15a and a second lens element 15b from the outer edge of the Fresnel lens sheet 11 toward the center of the same which is on the optical axis C.

As shown in FIGS. 3A and 3B, each of the first lens elements 15a is designed to have a focal length $f_1$ so that light rays which have passed through the first lens elements 15a are collected at a point $P_1$ on the optical axis C. Further, each of the second lens elements 15b is designed to have a focal length $f_2$ so that light rays which have passed through the second lens elements 15b are collected at a point $P_2$ which is nearer to the Fresnel leans sheet 11 than the point $P_1$. This means that the focal length $f_1$ for the first lens elements 15a is greater than the focal length $f_2$ for the second lens elements 15b. The first and second lens elements 15a and 15b are alternately disposed, and each pair of adjoining first and second lens elements 15a and 15b has a unit length U as indicated in FIG. 3B. FIG. 4 shows the focal length f is constant irrespective of the Fresnel lens radius for each of the first and second groups of the lens elements 15.

Although the embodiment shown in FIGS. 3A and 3B has two groups of the compound first and second lens elements, a third and subsequent groups of Fresnel lens elements 15 may be provided additionally. In this case, the focal lengths of all the groups must be different. The number of such groups of Fresnel lens elements 15 will be referred to as the number N hereafter.

It will be understood from the above that if the rear projection screen 10 is viewed at a lateral distance from the rear projection screen, far greater than the pitch of the Fresnel lens elements 15, light appears to be emitted from a point on the Fresnel lens 11 in two different directions as shown in FIG. 3A.

The rear projection screen 10 has a high horizontal light distribution characteristic owing to the agency of the lenticular lenses 17. The effect of vertical light distribution characteristic of the rear projection screen 10 owing to the Fresnel lens sheet 11 of the present invention will be explained hereafter.

Referring to FIG. 5 illustrating the light emitting characteristic of the rear projection screen 10 including the Fresnel lens sheet 11 having the compound Fresnel lens groups of the number N=2, the difference between the light emitting angle $\phi_1$ of the first lens elements 15a having the focal length $f_1$ and the light emitting angle $\phi_2$ of the second lens elements 15b having the focal length $f_2$ in a central region CN of the rear projection screen 10 is small, i.e., $\phi_1 \approx \phi_2$. In contrast the difference between the light emitting angle $\phi_1$ of the first lens elements 15a and the light emitting angle $\phi_2$ of the second lens elements 15b in a peripheral region E of the rear projection screen 10 is considerably large, i.e., $\phi_1 > \phi_2$.

FIG. 6 illustrates the vertical light diffusing characteristic of the rear projection screen 10. The vertical light diffusing characteristic of the central region CN of the rear projection screen 10 is similar to that of the conventional rear projection screen. However, since the peripheral region E of the rear projection screen 10 diffuses light in two different directions at a large diffusion angle, the peripheral region E has a high vertical light diffusing characteristic. Thus, in the rear projection screen 10, the peripheral region E has a high vertical light diffusing characteristic and the central region CN has a low vertical light diffusing characteristic, which affects greatly the variation of the luminance of the rear projection screen 10 with the vertical variation of the viewing position.

FIGS. 11A, 11B, 12A and 12B comparatively show the variation of luminance distributions on the rear projection screen 10 of the present invention and a prior art rear projection screen 100 with viewing position. As is obvious from FIGS. 11A and 11B, when the rear projection screen 10 is viewed from a viewing position on an axis perpendicular to the center of the same, the luminance of the central region CN is equal to that of the prior art rear projection screen 100, and the luminance of the peripheral region E of the rear projection screen 10 of the present invention is higher than that of the prior art rear projection screen 100. Thus, the rear projection screen 10 of the present invention has a uniform, high luminance distribution over the entire surface thereof.

Figure 12A:
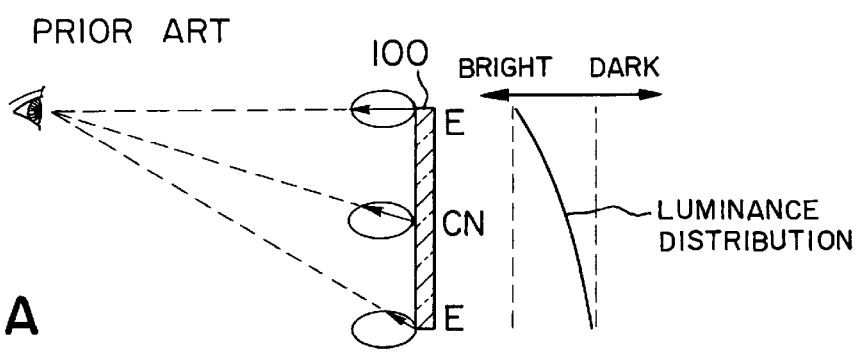
FIG. 12A is a diagrammatic view showing luminance distribution as viewed at a high position in a prior art rear projection screen.
Figure 12B:
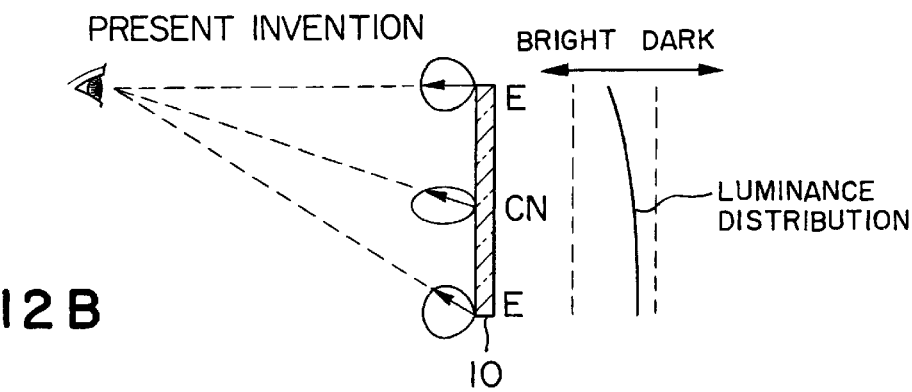
FIG. 12B is a diagrammatic view showing luminance distribution as viewed at a high position in the rear projection screen according to the present invention.

As is obvious from FIG. 12A, when the prior art rear projection screen 100 is viewed from a viewing position vertically dislocated from the axis perpendicular to the center of the rear projection screen 100, the luminance of a region right in front of the viewing position of the rear projection screen is very high as compared with those of other regions. In the rear projection screen 10 of the present invention, the vertical light diffusing characteristic of the upper and the lower peripheral region E is relatively high and that of the central region CN is relatively low. Therefore the luminance distribution on the rear projection screen 10 is uniform as viewed from viewing positions other than the viewing position on the axis perpendicular to the center of the rear projection screen 10.

Figure 13:
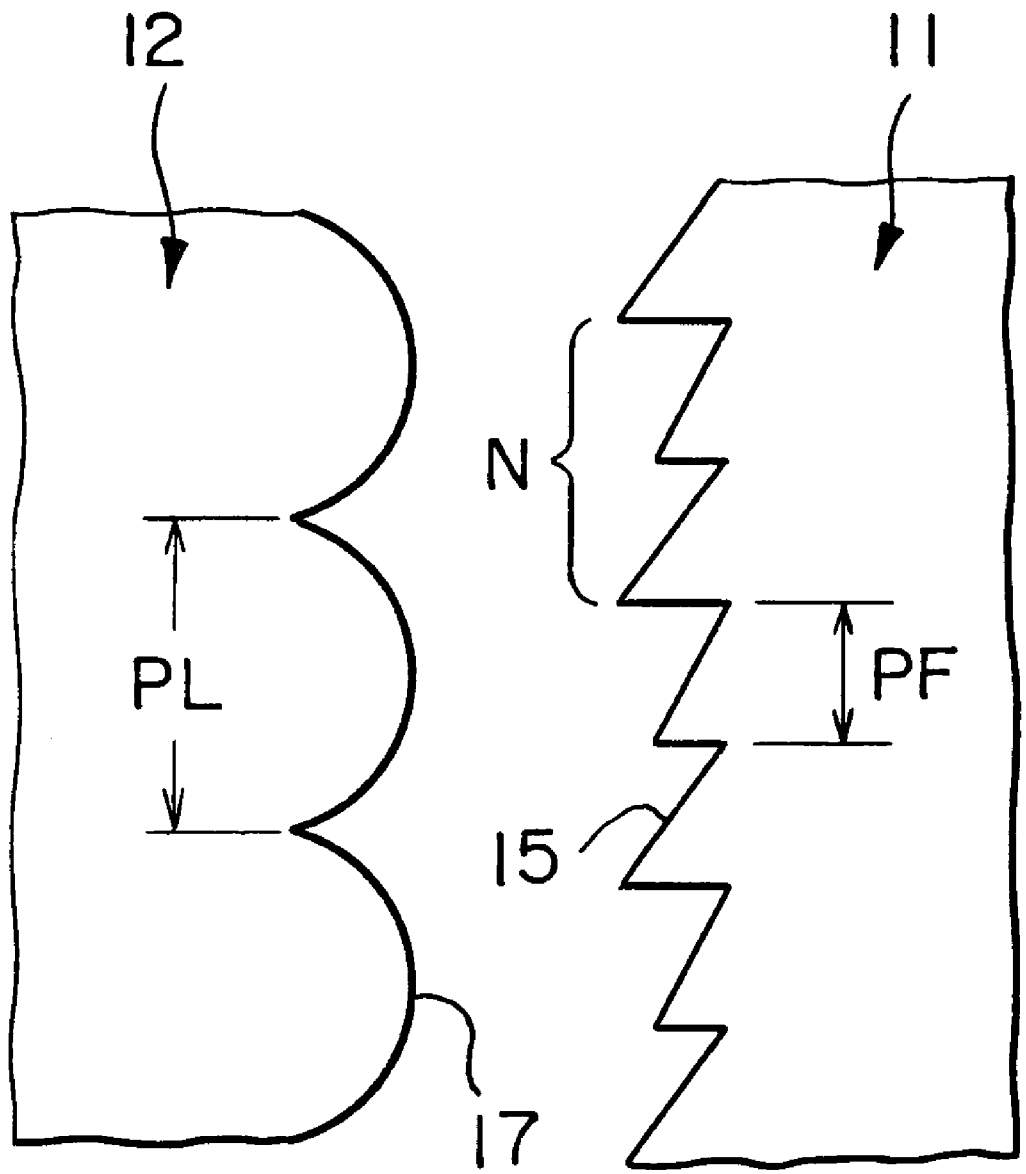
FIG. 13 is a view explanatory of the width of lenticular lenses and the pitch of Fresnel lens elements.

FIG. 13 is a view explaining the number N of the lens element groups of the Fresnel lens sheet 11 of the present invention. The resolution of the rear projection screen 10 as applied to as projection TV set is dependent on the width PL of the lenticular lenses 17 of the lenticular lens sheet 12, and it is therefore preferable that the length of the compound Fresnel lens groups is not greater than the width PL of the lenticular lenses 17. Therefore it is desirable that the number N meets an inequality:

$$2 \leq N \leq PL/PF \quad (1)$$

where PF is the pitch of the lens elements 15 of the Fresnel lens sheet 11. The lenticular lens sheet may be either a single-side lenticular lens sheet or a black stripe lenticular lens sheet provided with light-absorbing black stripes on the nonlight emitting surfaces as shown in FIG. 1.

The present invention is not limited in its practical application to the embodiment specifically described above and various changes and variations may be made therein without departing from the scope of the invention.

Figure 7:
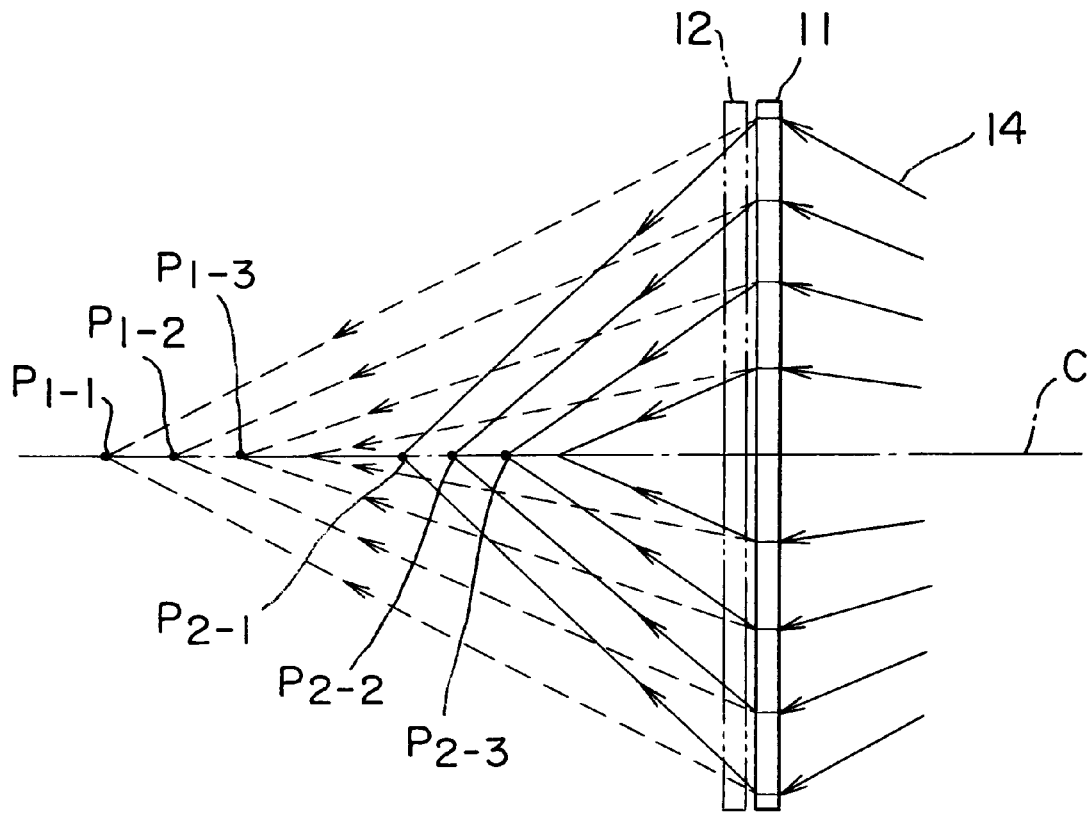
FIG. 7 is a view similar to FIG. 3A but showing another embodiment of the Fresnel lens sheet according to the present invention.

FIG. 7 shows another embodiment of the present invention.

Figure 8:
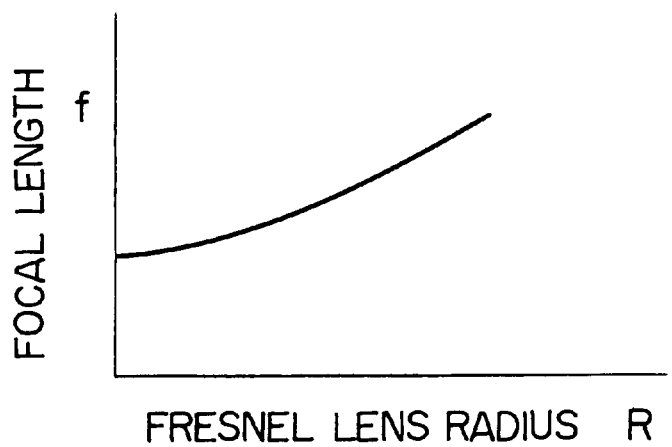
FIG. 8 is a graph showing the relationship between Fresnel lens radius and focal length in the embodiment shown in FIG. 7.

The difference of this embodiment from the embodiment of FIG. 3A is that the Fresnel lens elements 15a of the first group do not have the same focal length but have different focal lengths so that the Fresnel lens elements 15a have gradually changing focal points $P_{1-1}$, $P_{1-2}$, $P_{1-3}$, .... Similarly, the Fresnel lens elements 15b of the second group do not have the same focal length but have different focal lengths so that the Fresnel lens elements 15b have gradually changing focal points $P_{2-1}$, $P_{2-2}$, $P_{2-3}$, .... How the focal length changes is shown in the graph of FIG. 8. That is, the focal length increases with increase of the Fresnel Lens radius. It is to be noted however that the focal lengths or points of the first group are within a first range which does not overlap a second range within which the focal lengths or points of the second group are included. It will be noted from FIG. 7 that the first range is greater than the second range. The substantially the same effects as described with reference to FIGS. 3A and 3B are obtained in this embodiment.

Figure 9:
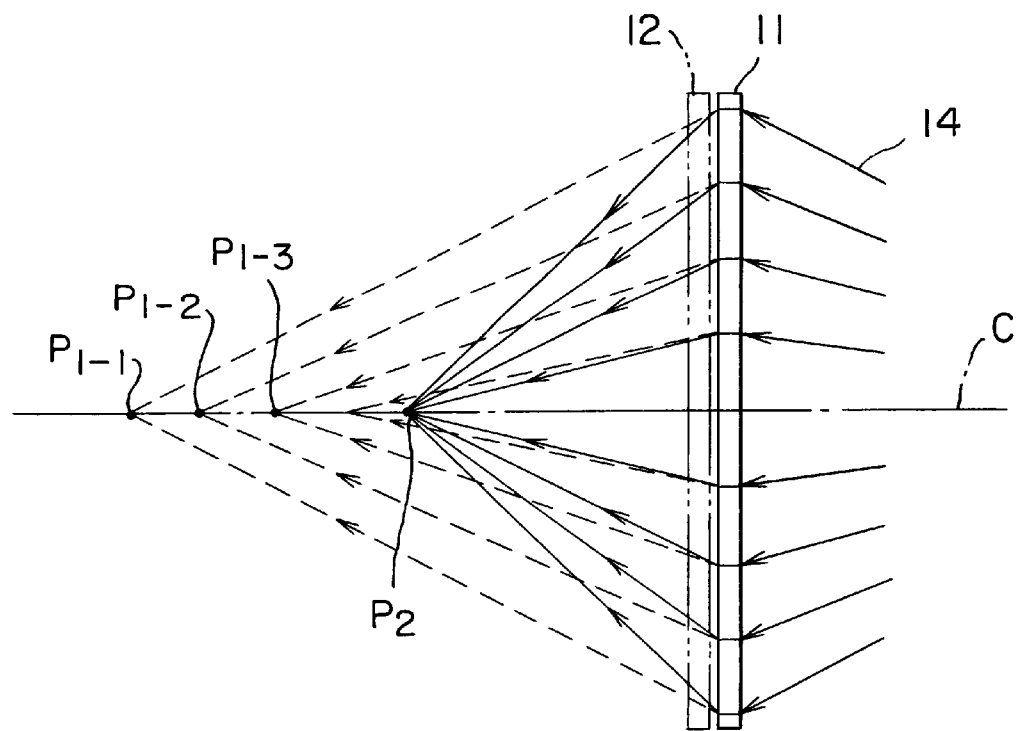
FIG. 9 is a view similar to FIG. 3A but showing a further embodiment of the Fresnel lens sheet according to the present invention.

FIG. 9 shows a further embodiment of the present invention. In this embodiment, the focal lengths of the Fresnel lens elements 15a of the first group are determined as in the case of the embodiment of FIG. 7, while a fixed focal length is determined for all the Fresnel lens elements 15b of the second group.

Figure 10:
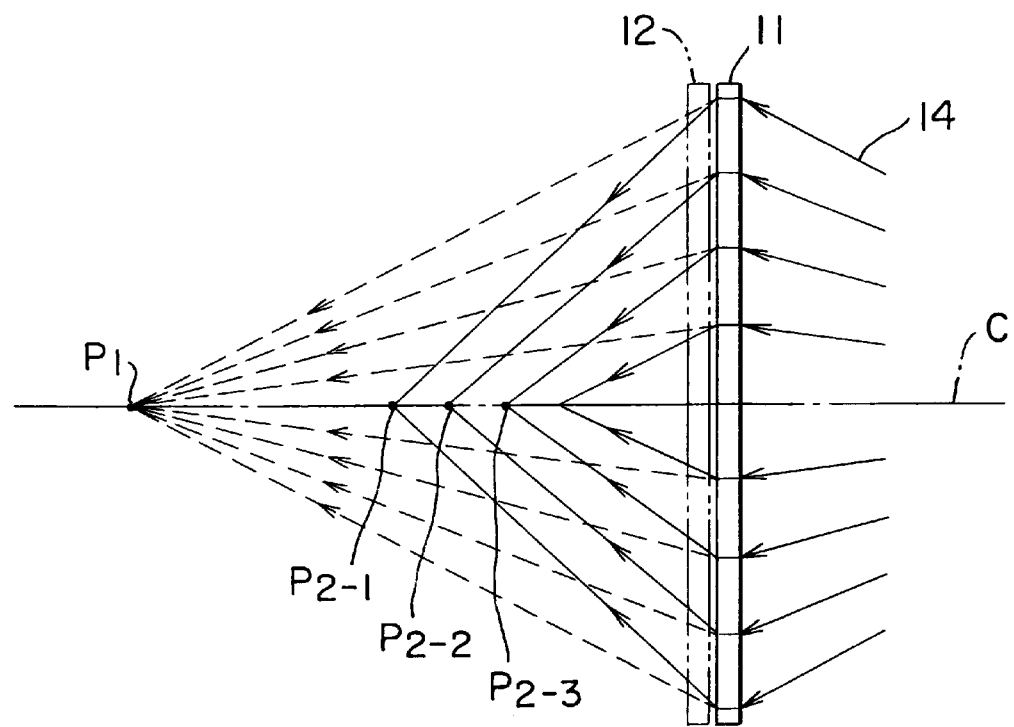
FIG. 10 is a view similar to FIG. 3A but showing a still further embodiment of the Fresnel lens sheet according to the present invention.
Figure 11A:
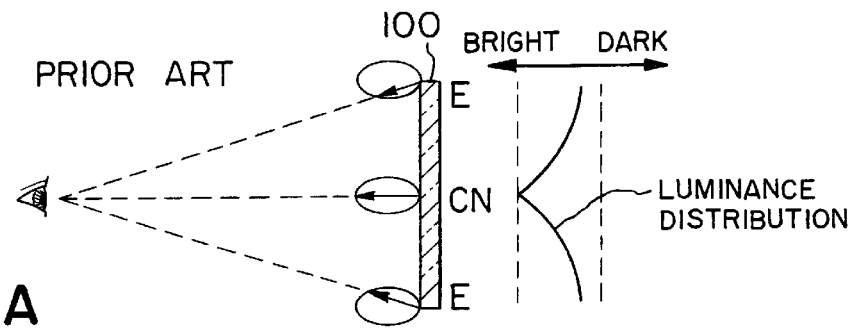
FIG. 11A is a diagrammatic view showing luminance distribution in a prior art rear projection screen.
Figure 11B:
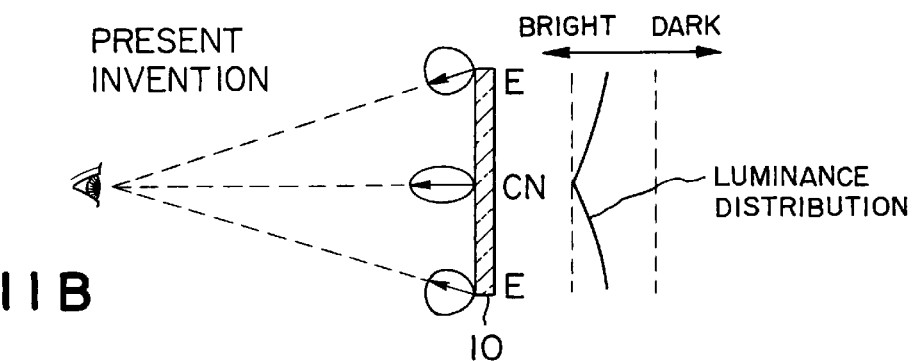
FIG. 11B is a diagrammatic view showing luminance distribution in the rear projection screen according to the present invention.

FIG. 10 shows a still further embodiment of the present invention. In this embodiment, a fixed focal length is determined for all the Fresnel lens elements 15a of the first group, while the focal lengths of the Fresnel lens elements 15b of the second group are determined as in the case of the embodiment of FIG. 7.

It should be understood that if the second range of the focal lengths of the Fresnel lens elements in FIG. 7 is made infinitesimal, the embodiment of FIG. 9 will be obtained, while if the first range of the focal lengths of the Fresnel lens elements in FIG. 7 is made infinitesimal, the embodiment of FIG. 10 will be obtained.

As is apparent from the foregoing description, according to the present invention, the rear projection screen is capable of emitting light in a uniform luminance distribution without entailing local luminance reduction, and increases the vertical angular range of an appropriate viewing region.

What is claimed is:

1. A rear projection screen comprising a Fresnel lens sheet and a lenticular lens sheet, said Fresnel lens sheet and said lenticular lens sheet being arranged in a face-to-face disposition, said Fresnel lens sheet having annular Fresnel lens elements disposed concentrically on a front surface of the Fresnel lens sheet for controlling light rays incident on a rear surface thereof to pass therethrough to the lenticular lens sheet, said lenticular lens sheet including parallel lenticular lenses facing said Fresnel lens elements;

wherein said Fresnel lens elements include:
a first group of Fresnel lens elements having a first focal length ($f_1$); and
a second group of Fresnel lens elements having a second focal length ($f_2$).

2. The rear projection screen according to claim 1, wherein said Fresnel lens elements of the first group and said Fresnel lens elements of the second group are arranged alternately to form adjoining pairs of a Fresnel lens element of a greater focal length and a Fresnel lens element of a smaller focal length.

3. A rear projection screen comprising a Fresnel lens sheet and a lenticular lens sheet, said Fresnel lens sheet and said lenticular lens sheet being arranged in a face-to-face disposition, said Fresnel lens sheet having annular Fresnel lens elements disposed concentrically on a front surface of the Fresnel lens sheet for controlling light rays incident on a rear surface thereof to pass therethrough to the lenticular lens sheet, said lenticular lens sheet including parallel lenticular lenses facing said Fresnel lens elements;

wherein said Fresnel lens elements include:
a first group of Fresnel lens elements having focal lengths within a first range; and
a second group of Fresnel lens elements having focal length within a second range, the focal length of the first range having larger values than the focal lengths of the second range.

4. The rear projection screen according to claim 3, wherein the Fresnel lens elements of said first group and the Fresnel lens elements of said second group are arranged alternatively to form adjoining pairs of a Fresnel lens element having a greater focal length and a Fresnel lens element having a smaller focal length.

5. The rear projection screen according to claim 3, wherein said first range of focal lengths is infinitesimal and is a fixed point.

6. The rear projection screen according to claim 3, wherein said second range of focal lengths is infinitesimal and is a fixed point.

7. A rear projection screen comprising a Fresnel lens sheet and a lenticular lens sheet, said Fresnel lens sheet and said lenticular lens sheet being arranged in a face-to-face disposition, said Fresnel lens sheet having annular Fresnel lens elements disposed concentrically on a front surface of the Fresnel lens sheet for controlling light rays incident on a rear surface thereof to pass therethrough to the lenticular lens sheet, said lenticular lens including parallel lenticular lenses each having a width and facing said Fresnel lens elements;

wherein said Fresnel lens elements include:
a first group of Fresnel lens elements having a first focal length ($f_1$); and
a second group of Fresnel lens elements having a second focal length ($f_2$); and a Nth group of Fresnel lens elements having a Nth focal length or a Nth range of focal lengths; and wherein conditions of the following formula exist $$2 \leq N \leq PL/PF$$

where:

PL is said width of the lenticular lens, PF is said pitch of the Fresnel lens elements, and N is the number of the groups of the Fresnel lens elements.

8. A rear projection screen comprising a Fresnel lens sheet and a lenticular lens sheet, said Fresnel lens sheet and said lenticular lens sheet being arranged in a face-to-face disposition, said Fresnel lens sheet having annular Fresnel lens elements disposed concentrically on a front surface of the Fresnel lens sheet for controlling light rays incident on a rear surface thereof to pass therethrough to the lenticular lens sheet, said lenticular lens including parallel lenticular lenses each having a width and facing said Fresnel lens elements;

wherein said Fresnel lens elements include:

a first group of Fresnel lens elements having a first range of focal lengths;

a second group of Fresnel lens elements having a second range of focal lengths; and a Nth group of Fresnel lens elements having a Nth focal length or a Nth range of focal lengths; and wherein conditions of the following formula exist $$2 \leq N \leq PL/PF$$

where:

PL is a said width of the lenticular lenses, PF is said pitch of the Fresnel lens elements, and N is the number of the groups of the Fresnel lens elements.

* * * * *